(12) United States Patent
Ota

(10) Patent No.: US 11,652,966 B2
(45) Date of Patent: May 16, 2023

(54) DISPLAY DEVICE, DISPLAY SYSTEM, AND DISPLAY CONTROL METHOD

(71) Applicant: SEIKO EPSON CORPORATION, Tokyo (JP)

(72) Inventor: Susumu Ota, Matsumoto (JP)

(73) Assignee: Seiko Epson Corportation, Tokyo (JP)

( * ) Notice: Subject to any disclaimer, the term of this patent is extended or adjusted under 35 U.S.C. 154(b) by 0 days.

(21) Appl. No.: 17/361,446

(22) Filed: Jun. 29, 2021

(65) Prior Publication Data

US 2022/0006990 A1   Jan. 6, 2022

(30) Foreign Application Priority Data

Jul. 3, 2020   (JP) ............................. JP2020-115459

(51) Int. Cl.
*H04N 9/31*   (2006.01)

(52) U.S. Cl.
CPC .......... *H04N 9/3185* (2013.01); *H04N 9/312* (2013.01); *H04N 9/3194* (2013.01)

(58) Field of Classification Search
CPC .. H04N 9/3194; H04N 9/3185; H04N 9/3182; H04N 9/31; H04N 9/3179; H04N 9/312
USPC ....... 348/739, 744–746, 806, 705, 594, 595; 382/254, 255, 263, 264, 266, 274, 275
See application file for complete search history.

(56) References Cited

U.S. PATENT DOCUMENTS

| | | | |
|---|---|---|---|
| 2012/0105317 A1* | 5/2012 | Oka ..................... | H04M 1/0202 345/1.1 |
| 2015/0067717 A1* | 3/2015 | Oliver .............. | H04N 21/41415 725/28 |
| 2019/0238805 A1* | 8/2019 | Ota ........................ | H04N 9/317 |

FOREIGN PATENT DOCUMENTS

| | | |
|---|---|---|
| JP | 2011-191674 A | 9/2011 |
| JP | 2013-20058 A | 1/2013 |
| JP | 2019-132955 A | 8/2019 |

OTHER PUBLICATIONS

Eizoglobal.com, Monitor Basics—The Technology to Use "Multiple Displays" Makes Windows 10 More Convenient—5 pages.

* cited by examiner

*Primary Examiner* — Sherrie Hsia
(74) *Attorney, Agent, or Firm* — Dority & Manning, P.A.

(57) ABSTRACT

A projector includes a projecting section configured to display an image, an image interface to which an image signal corresponding to a first image is input from a personal computer, an image processing section configured to generate a second image obtained by reducing visibility of the first image based on the image signal, and a first control section configured to, when a first condition is satisfied, cause the projecting section to display the second image and, when a second condition is satisfied, cause the projecting section to display the first image.

12 Claims, 11 Drawing Sheets

DISPLAY DEVICE, DISPLAY SYSTEM, AND DISPLAY CONTROL METHOD

The present application is based on, and claims priority from JP Application Serial Number 2020-115459, filed Jul. 3, 2020, the disclosure of which is hereby incorporated by reference herein in its entirety.

BACKGROUND

1. Technical Field

The present disclosure relates to a display device, a display system, and a display control method.

2. Related Art

There has been known a technique for preventing a display, device from, displaying information that a user does not desire to make public (see, for example, JP-A-2011-191674 (Patent Literature 1)). In the technique described in Patent Literature 1, an imaging device including a monitor is capable of outputting an image to an external display device. The imaging device displays the image on the monitor before outputting the image to the display device. The user performs publication setting for the displayed image. The imaging device stores the image, for which the publication setting is performed, in a publication-image storing section and outputs the image stored in the publication-image storing section to the display device.

The user sometimes cannot check beforehand an image to be displayed, for example, when the display device starts to display the image. A method of preventing display of an image not desired to be made public in such a case has not been proposed.

SUMMARY

An aspect of the present disclosure is directed to a display device including: a display section configured to display an image; an interface circuit to which an image signal corresponding to a first image is input from an image supply device; an integrated circuit configured to generate a second image obtained by reducing visibility of the first image based on the image signal; and a processor programmed to, when a first condition is satisfied, cause the display section to display the second image and, when a second condition is satisfied, cause the display section to display the first image.

Another aspect of the present disclosure is directed to a display system including: a display device including a display section configured to display an image; and an image supply device configured to input an image signal corresponding to a first image to the display device. The display device includes: an integrated circuit configured to generate a second image obtained by reducing visibility of the first image based on the image signal; and a processor configured to, when a first condition is satisfied, cause the display section to display the second image and, when a second condition is satisfied, cause the display section to display the first image.

Still another aspect of the present disclosure is directed to a display control method includes: generating a second image obtained by reducing visibility of a first image; displaying the second image when a first condition is satisfied; and, displaying the first image when a second condition is satisfied.

DESCRIPTION OF EXEMPLARY EMBODIMENTS

Embodiments are explained below with reference to the drawings.

1. First Embodiment 1-1. Configuration of a Display System

Figure 1:
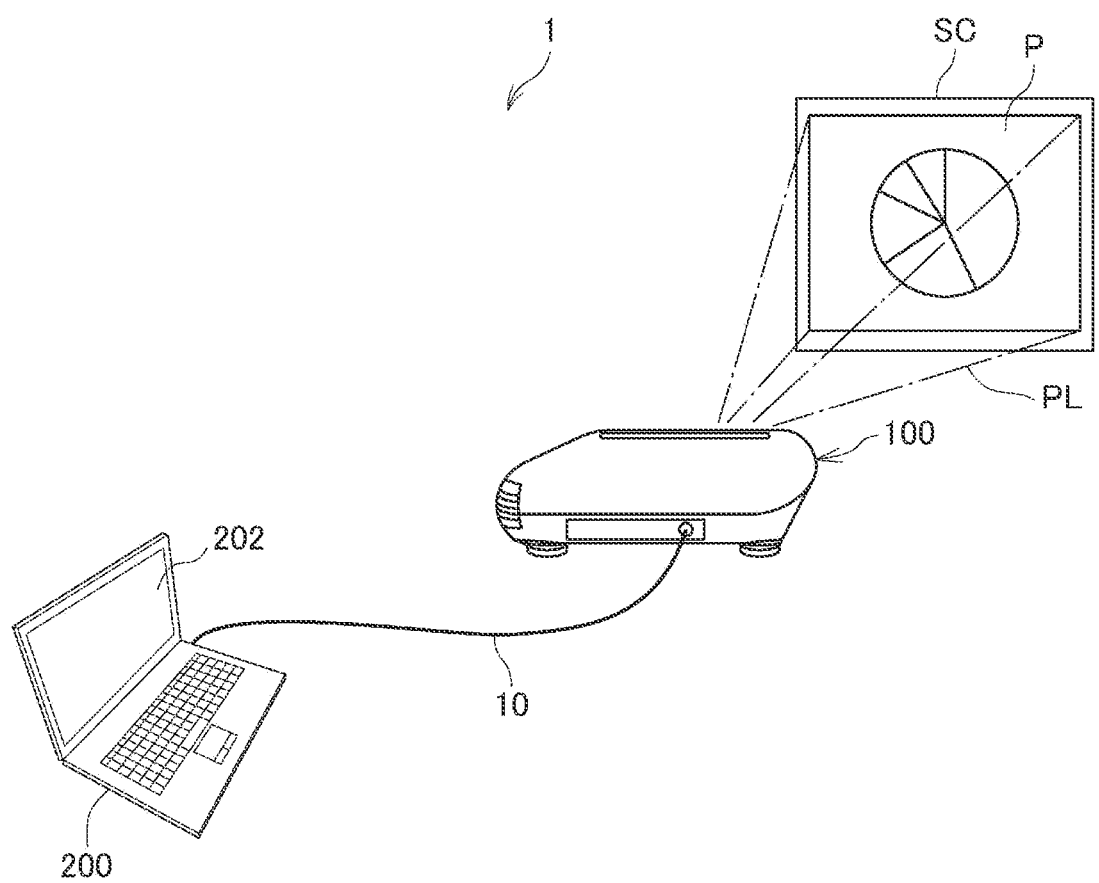
FIG. 1 is a diagram showing an example of the configuration of a display system.

FIG. 1 is a diagram showing as example of the configuration of a display system 1.

The display system 1 includes a display device and a personal computer 200. In a first embodiment, a projector 100 is explained as an example of the display device.

The projector 100 is connectable to external devices that transmit image information. These devices are called image supply device. The projector 100 projects image light PL onto a screen SC based on the image information transmitted from the image supply device. Consequently, a projected image P is displayed on the screen SC. The operation of the projector 100 projecting the image light PL is referred to as display in the following explanation.

In FIG. 1, an example is shown in which the personal computer 200 is connected to the projector 100 as the image supply device. The personal computer 200 is connected to the projector 100 by, for example, a cable 10. The cable 10 is, for example, an HDMI (Hight-Definition Multimedia Interface) cable conforming to an HDMI standard. In this configuration, the personal computer 200 executes communication conforming to the HDMI standard with the projector 100 and transmits data including image information and control data to the projector 100. A configuration may be adopted in which the projector 100 and the personal computer 200 are connected by wireless communication and wirelessly transmit the data including the image information. HDMI is a registered trademark.

In FIG. 1, an example of floor installation for placing the projector 100 on a floor in front of the screen SC is shown. However, the projector 100 may be suspended from a ceiling and set. In this embodiment, as an example, the projector 100 projects the image light PL onto a plane screen SC. However, a projection target is not limited to the screen SC and may be a plane such as a wall surface of a building or may be a curved surface or an uneven surface.

1-2. Configuration of the Projector

Figure 2:
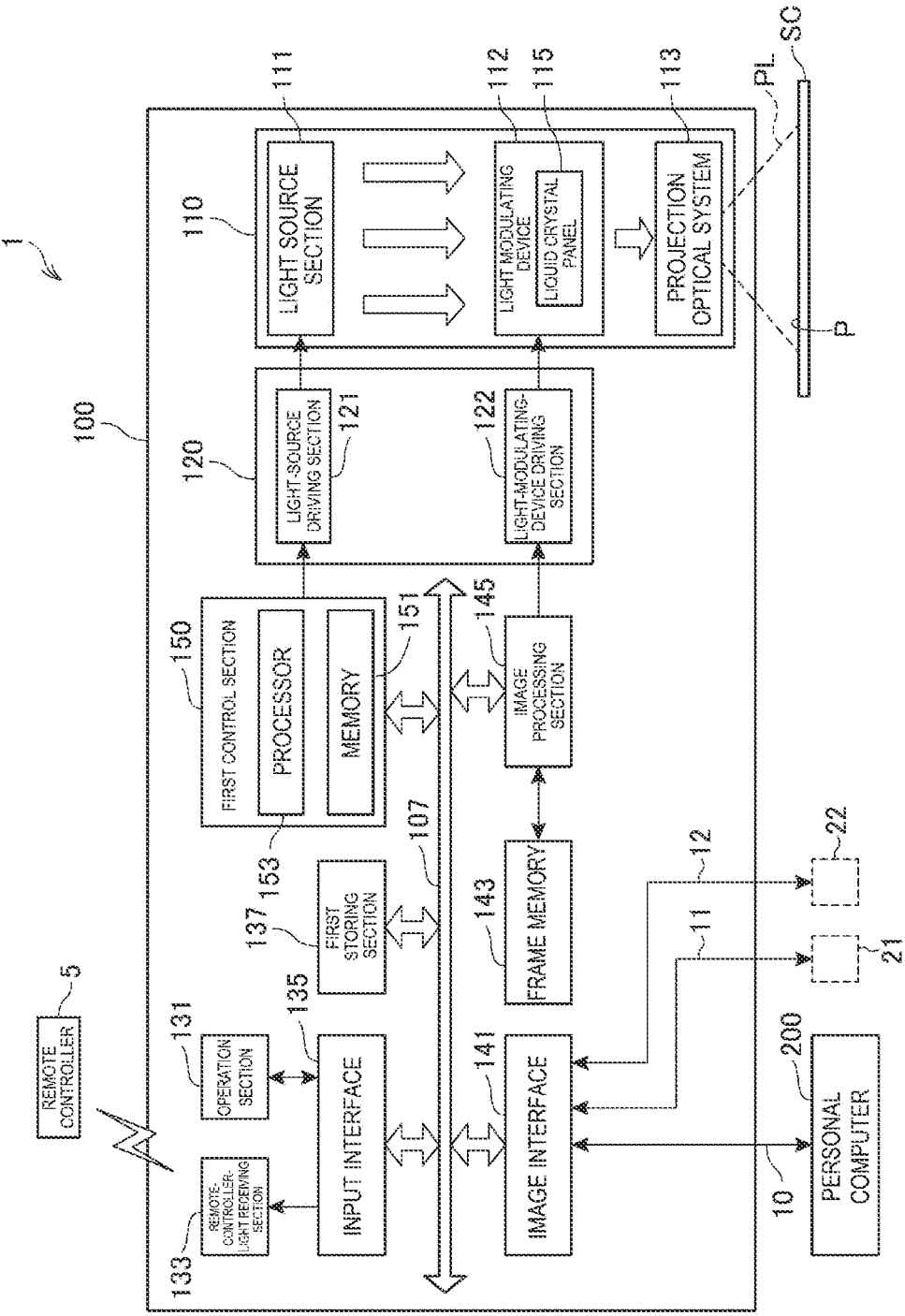
FIG. 2 is a block diagram of a projector.

FIG. 2 is a diagram showing an example of the configuration of the projector 100 according to this embodiment.

The projector 100 includes a projecting section 110 and a driving section 120 that drives the projecting section 110. The projecting section 110 forms an optical image and projects the image onto the screen SC to display the image on the screen SC.

The projecting section 110 includes a light source section 111, a light modulating device 112, and a projection optical system 113. The driving section 120 includes a light-source driving section 121 and a light-modulating-device driving section 122. The projecting section 110 corresponds to an example of the display section.

The light source section 111 includes a lamp such as a halogen lamp, a xenon lamp, or an ultra-high pressure mercury lamp or a solid-state light source such as an LED (Light Emitting Diode) or a laser light source. The light source section 111 may include a reflector that guides light emitted by a light source to the light modulating device 112 and an auxiliary reflector. Further, the light source section 111 may include a lens group and a polarizing plate for improving an optical characteristic of projected light or a dimming element or the like for reducing, on a path leading to the light modulating device 112, a light amount of the light emitted by the light source.

The light-source driving section 121 lights and extinguishes the light source of the light source section 111 according to an instruction of a first control section 150.

The light modulating device 112 includes a light modulating element and modulates the light emitted by the light source section 111 to generate the image light PL. The light modulating device 112 includes, as the light modulating element, for example, three liquid crystal panels 115 corresponding to the three primary colors of R, G, and B. The liquid crystal panels 115 may be transmission-type liquid crystal panels or may be reflection-type liquid crystal panels. The light emitted by the light source section 111 is separated into, for example, color lights of the three colors of R, G, and B and made incident on the liquid crystal panels 115 corresponding to the color lights of R, G, and B and modulated. The color lights are combined into the image light PL by a combination optical system such as a cross dichroic prism. The image light PL is emitted to the projection optical system 113. The light modulating element included in the light modulating device 112 is not limited and may be, for example, a digital micromirror device.

The light modulating device 112 is driven by the light-modulating-device driving section 122. The light-modulating-device driving section 122 is coupled to an image processing section 145.

Image data corresponding to the primary colors of R, C, and B are input to the light-modulating-device driving section 122 from the image processing section 145. The light-modulating-device driving section 122 converts the input image data into a signal suitable for the operation of the liquid crystal panels 115. The light-modulating-device driving section 122 applies a voltage to the liquid crystal panels 115 based on the converted signal and draws images on the liquid crystal panels 115.

The projection optical system 113 includes a lens, a mirror, and the like for forming an image of the incident image light PL on the screen SC. The projection optical system 113 may include a zoom mechanism for enlarging or reducing an image projected onto the screen SC and a focus adjusting mechanism for adjusting a focus.

The projector 100 further includes an operation section 131, a remote-controller-light receiving section 133, an input interface 135, a first storing section 137, an image interface 141, a frame memory 143, an image processing section 145, and a first control section 150. These sections are connected to one another via an internal bus 107 to be capable of performing data communication.

The operation section 131 includes not-shown operators such as buttons and switches provided on a housing of the projector 100. The operation section 131 receives operation on the operators, generates an operation signal corresponding to the operation, and outputs the operation signal to the input interface 135. The input interface 135 outputs the operation signal input from the operation section 131 to the first control section 150.

The remote-controller-light receiving section 133 receives an infrared signal transmitted from a remote controller 5 and decodes the received infrared signal to generate an operation signal. The remote-controller-light receiving section 133 outputs the generated operation signal to the input interface 135. The input interface 135 outputs the operation signal input from the remote-controller-light receiving section 133 to the first control section 150.

The operation section and the remote-controller-light receiving section 133 correspond to an example of the receiving section.

The first storing section 137 is a nonvolatile storage device such as a hard disk drive or an SSD (Solid State Drive). The first storing section 137 stores a program to be executed by a processor 153 explained below and data to be processed by the processor 153.

The image interface 141 includes a connector and an interface circuit and is coupled to an image supply device different from the projector 100. The image interface 141 corresponds to an example of the input section.

In this embodiment, the image interface 141 includes an HDMI connector and an HDMI interface circuit. The image interface 141 executes communication between the image interface 141 and the personal computer 200 via the cable 10 according to the HDMI standard.

The image interface 141 may include a plurality of connectors and a plurality of interface circuits. For example, cables 11 and 12 may be connectable to the image interface 141 besides the cable 10. As the cables 11 and 12, a USB (Universal Serial Bus) cable, a VGA cable, an Ethernet (registered trademark) cable, and the like can be adopted. For example, the image interface 141 may be connectable to image supply devices 21 and 22 via the cables 11 and 12. In this case, image data can be input to the image interface 141 from each of the image supply devices 21 and 22. The image interface 141 may include a communication interface circuit that executes data communication conforming to a communication standard such as Ethernet.

The image supply device connectable to the image interface 141 only has to be a device that outputs image data. Examples of the image supply device include a recording medium playing device such as a DVD player, a media streaming device that acquires data via a communication line and outputs image data based on the acquired data, and a communication terminal device such as a smartphone. The number of image supply devices connectable to the image interface 141 is not limited.

The image interface 141 may have a function of a card reader that reads image data from a portable recording medium such as an SD (registered trademark) card.

The image interface 141 may include a wireless communication interface circuit that executes wireless data communication. In this case, the image interface 141 can acquire image data from the image supply devices 21 and 22 or other devices by wireless communication.

Apparatuses and devices that supply image data to the image interface 141 are collectively referred to as image source. When the image interface 141 is capable of using a plurality of image sources, the projector 100 is capable of selecting any one of the plurality of image sources. The first control section 150 may automatically perform the selection of the image source. For example, when priority of the respective image sources is decided in advance, the first control section 150 selects one image source according to the priority order. The first control section 150 may select an image source according to operation received by the operation section 131 or operation performed using the remote controller 5.

The image interface 141 may include a connector to which a cable for transmitting an analog image signal is connectable and an interface circuit to which the analog image signal can be input. In this case, the image interface 141 includes a conversion circuit that converts the analog image signal into digital image signal.

The image interface 141 selects the image source according to control by the first control section 150 and outputs image data input from the selected image source to the image processing section 145.

The first control section 150 includes a memory 151 and a processor 153. The first control section 150 corresponds to an example of the control section according to the present disclosure.

The memory 151 is a storage device that stores a program to be executed by the processor 153 and data. The memory 151 is configured by a magnetic storage device, a semiconductor storage element such as a flash ROM (Read Only Memory), or a storage device of another type. The memory 151 may include a RAM (Random Access Memory) configuring a work area of the processor 153. The memory 151 stores data to be processed by the first control section 150 and a control program to be executed by the processor 153.

The processor 153 may be configured by a single processor. A plurality of processors may be configured to function as the processor 153. The processor 153 executes the control program to control the sections of the projector 100. For example, the processor 153 selects, out of the image sources coupled to the image interface 141, an image source that outputs an image to be displayed. The processor 153 controls the image interface 141 to output image data input from the image source to the image processing section 145. The processor 153 outputs an execution instruction for image processing and parameters used for the image processing to the image processing section 145. The parameters include, for example, a geometrical correction parameter for correcting geometrical distortion of an image projected onto the screen SC. The processor 153 controls the light-source driving section 121 to control lighting and extinction of the light source section 111 and adjusts the luminance of the light source section 111.

The image processing section 145 and the frame memory 143 can be configured by, for example, an integrated circuit. The integrated circuit includes an LSI, an ASIC (Application Specific Integrated Circuit), and a PLD (Programmable Logic Device). For example, an FPGA (Field-Programmable Gate Array) is included in the PLD. An analog circuit may be included in a part of the configuration of the integrated circuit. The image processing section 145 and the frame memory 143 may be a combination of a processor and an integrated circuit. The combination of the processor and the integrated circuit is called microcontroller (MCU) SoC (System-on-a-chip), system LSI, chip set, and the like.

The image processing section 145 develops the image data input from the image interface 141 in the frame memory 143. The frame memory 143 includes a plurality of banks. The banks have a storage capacity enough for writing image data for one frame. The frame memory 143 is configured by, for example, an SDRAM (Synchronous Dynamic Random Access Memory).

The image processing section 145 performs, on the image data developed in the frame memory 143, image processing such as resolution conversion processing, resize processing, correction of distortion aberration, shape correction processing, digital zoom processing, or adjustment of the tint and the luminance of an image.

1-3. Configuration of the Control Section

Figure 3:
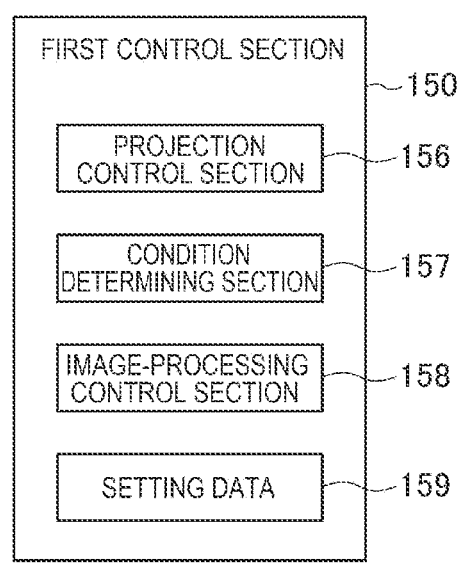
FIG. 3 is a functional block diagram of a control system of the projector.

FIG. 3 is a functional block diagram showing the configuration of a control system of the projector 100 and shows an example of the configuration of the first control section 150.

As shown in FIG. 3, the first control section 150 of the projector 100 includes a projection control section 156, a condition determining section 157, and an image-processing control section 158. The processor 153 executes the control program stored in the memory 151, whereby these functional sections are realized by cooperation of software and hardware. The first control section 150 includes setting data 159. The setting data 159 is stored in, for example, the memory 151.

The projection control section 156 controls the image interface 141 to select an image source. The projection control section 156 controls the driving section 120 and the image processing section 145 to display an image with the projecting section 110 based on image data input from the selected image source.

The condition determining section 157 determines whether an operation state of the projector 100 and/or a state of the control by the first control section 150 satisfies preset conditions. The conditions to be determined by the condition determining section 157 are in the setting data 159. In this embodiment, the condition determining section 157 determines a first condition and a second condition. The first condition is a condition for the projector 100 to display a second image generated by modifying the image based on the image data input from the image source. The second condition is a condition for the projector 100 to permit display of a first image based on the image data input from the image source.

The image-processing control section 158 controls the image processing section 145 to generate the first image based on the image data and generate the second image by applying image processing to the first image. The image-processing control section 158 outputs, to the image processing section 145, control data for designating a type of the image processing applied to the first image and parameters of the image processing.

The first image is an image displayed by normal processing based on the image data input from the image source. In contrast, the second image is an image generated from, the first image, the image being different from the first image. Specifically, the second image is an image generated by applying image processing for reducing visibility to the first image. The first image and the second image are explained below.

The setting data 159 includes data for deciding contents of the first condition and the second condition determined by the condition determining section 157. The setting data 159 includes data for designating a type or image processing executed by the image processing section 145 when it is determined that the first condition is satisfied and parameters of the image processing.

1-4. Configuration of the Personal Computer

Figure 4:
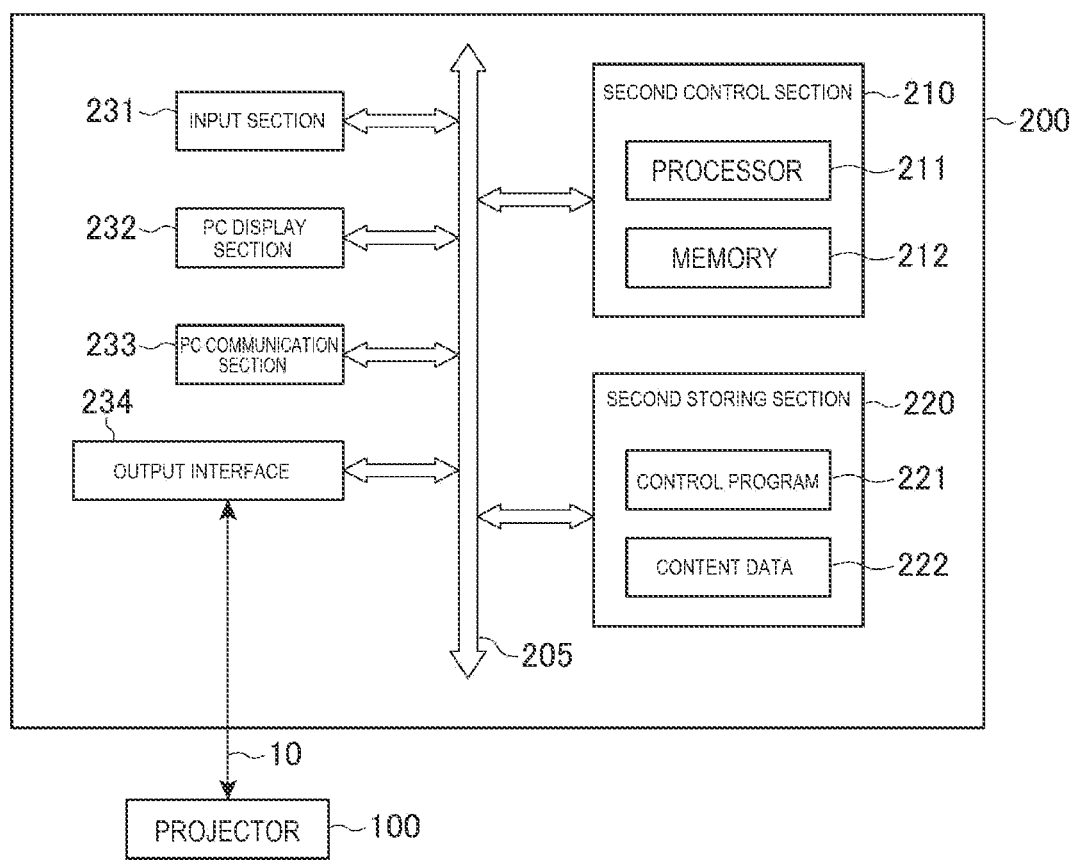
FIG. 4 is a block diagram of a personal computer.

FIG. 4 is a block diagram, showing the configuration of the personal computer 200.

The personal computer 200 is a general-purpose computer of a desktop type, a laptop type, or a tablet type.

The personal computer 200 includes a second control section 210 and a second storing section 220.

The second control section 210 executes a program to thereby, execute data processing and controls sections of the personal computer 200.

The second control section 210 includes a processor 211 and a memory 212. The memory 212 is a storage device that stores a basic control program to be executed by the processor 211 and data. The memory 212 is configured by a magnetic storage device, a semiconductor storage element such as a flash ROM, or a storage device of another type. The memory 212 may include a RAM configuring a work area of the processor 211.

The second storing section 220 is a nonvolatile storage device such as a hard disk drive or an SSD. The second storing section 220 stores a program to be executed by the processor 211 and data to be processed by the processor 211. The second storing section 220 stores a control program 221 to be executed by the processor 211 and content data 222. The content data 222 is data of contents including videos, still images, sound, and texts. For example, the personal computer 200 reproduces the content data 222 to thereby display a video and a still image on a PC display section 232. A data format of the content data 222 is not limited. The content data 222 may be data processed by a specific application program executed by the processor 211.

The personal computer 200 includes an input section 231, a PC display section 232, a PC communication section 233, and an output interface 234. These sections are coupled to the second control section 210 by a bus 205.

The input section 231 includes a not-shown input device such as a keyboard, a mouse, or a trackpad and receives operation on the input device. The input section 231 detects the operation on the input device, generates operation data indicating the detected operation, and outputs the operation data to the second control section 210.

The PC display section 232 includes a display screen such as a liquid crystal display panel and displays various screens according to control by the second control section 210.

The PC communication section 233 includes a connector and a communication interface circuit to which a communication cable conforming to the Ethernet standard is connectable. The PC communication section 233 executes data communication between the PC communication section 233 and external devices. The PC communication section 233 may include a wireless communication interface conforming to a Wi-Fi (registered trademark) standard.

The output interface 234 transmits image data to devices on the outside of the personal computer 200 according to the control by the second control section 210. The output interface 234 includes a connector and an interface circuit to which an image transmission cable such as the cable 10 is connectable. The output interlace 234 may include a wireless communication interface that wirelessly transmits the image data. In this embodiment, the cable 10 is coupled to the output interface 234. The output interface 234 transmits the image data to the projector 100.

The second control section 210 executes data processing based on the operation data input from the input section 231 and/or data received by the PC communication section 233 and causes the PC display section 232 to display a processing result or the like. For example, the second control section 210 performs processing for reproducing the content data 222 stored by the second storing section 220 and causes the PC display section 232 to display an image of the content data 222.

The second control section 210 can execute processing for causing both of the PC display section 232 and a display device coupled via the output interface 234 to display an image. In this embodiment, the output interface 234 is coupled to the projector 100. In this case, the second control section 210 executes a display mode in which the PC display section 232 and the projector 100 are used.

For example, the second control section 210 is capable of switching a mirroring mode and an extension mode. In the mirroring mode, the second control section 210 causes the projector 100 to display the same content as content displayed on the PC display section 232. In the mirroring mode, the PC display section 232 and the projector 100 perform the same display. A state in which the PC display section 232 and the projector 100 perform the same display includes a state in which processing for correcting display resolutions and color tones of the PC display section 232 and the projector 100 is applied. The mirroring mode corresponds to the first operation state and the extension mode corresponds to the second operation state.

In the extension mode, the second control section 210 causes the PC display section 232 and the projector 100 to display different contents. In the extension mode, the second control section 210 can use the projector 100 as a second display section that extends a display region of the PC display section 232. As an example of use of the extension mode, the second control section 210 causes the PC display section 232 to display a screen concerning basic functions of the projector 100 and causes the projector 100 to display a screen of a specific application program executed by the second control section 210. In this case, there is an advantage that the user who operates the personal computer 200 can use a large display region as if the display region of the PC display section 232 is extended by the projector 100.

Data output from the output interface 234 to the projector 100 includes data capable of distinguishing whether the personal computer 200 is in the mirroring mode or the extension mode. The data may be, for example, a flag indicating whether the personal computer 200 is in the extension mode. Consequently, the projector 100 can detect, based on the image data input from the personal computer 200, whether the personal computer 200 is in the extension mode.

1-5. Image Processing

Figure 5:
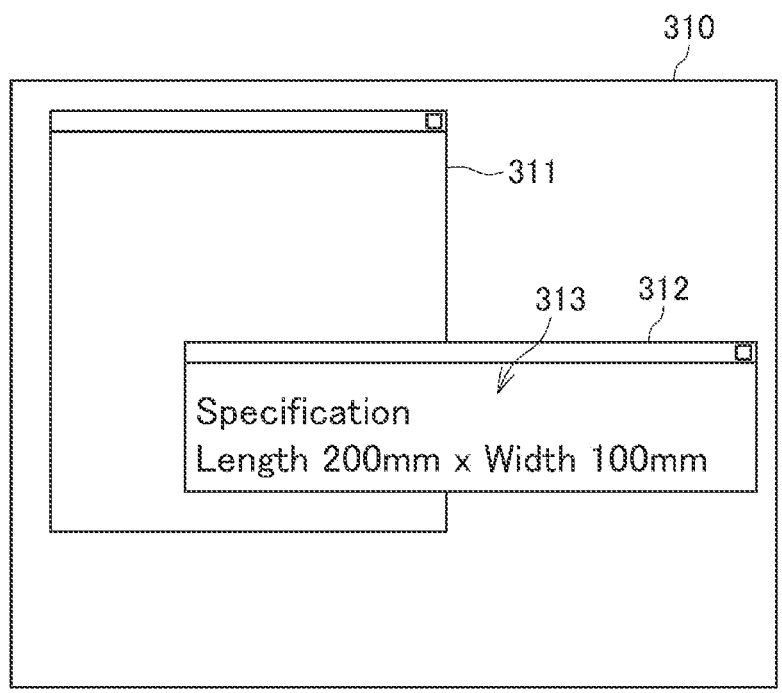
FIG. 5 is a diagram showing an example of a first image d splayed by the projector.
Figure 6:
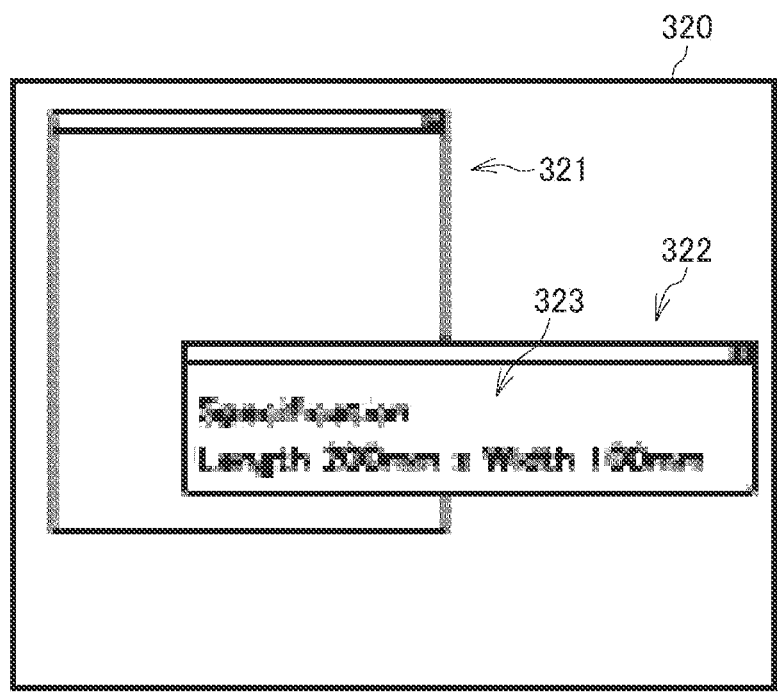
FIG. 6 is a diagram showing an example of a second image displayed by the projector.
Figure 7:
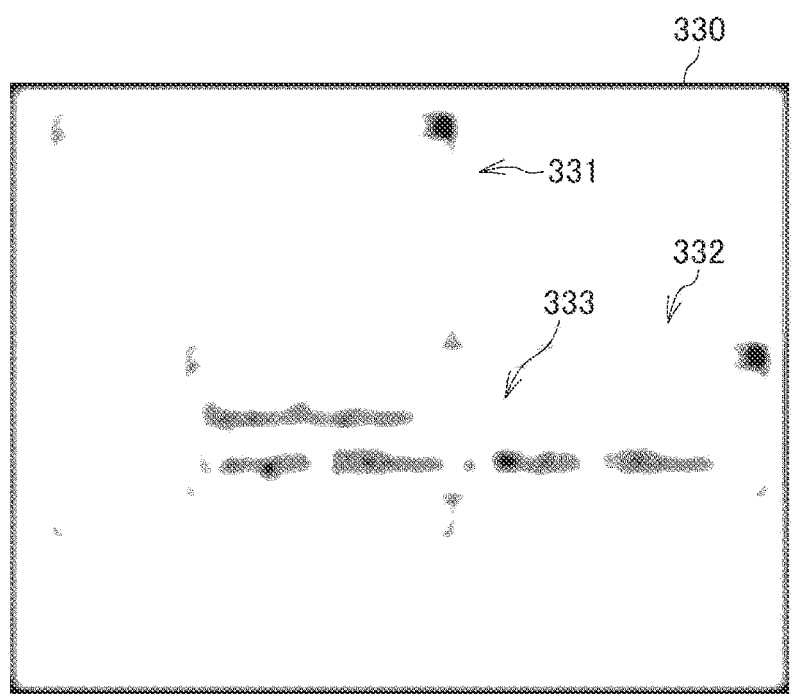
FIG. 7 is a diagram showing another example of the second image displayed by the projector.
Figure 8:
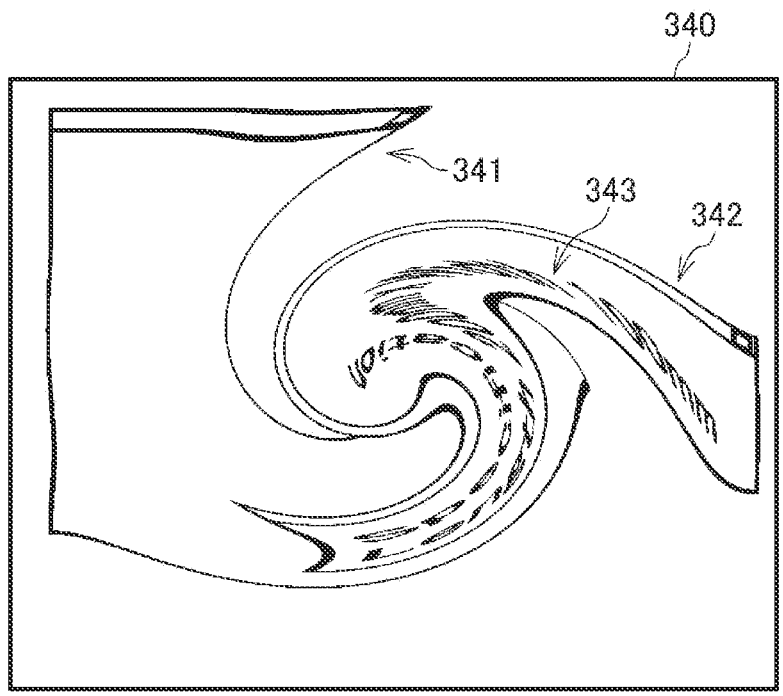
FIG. 8 is a diagram showing still another example of the second image displayed by the projector.

FIG. 5 shows an example of the first image displayed by the projector 100. FIGS. 6, 7, and 8 show examples of the second image displayed by the projector 100. The first image and the second image displayed by the projector 100 are explained with reference to these figures.

The first image is an image displayed in normal processing based on image data input from an image source. In contrast, the second image is an image generated from the first image, the image being different from the first image. Specifically, the second image is an image generated by applying image processing for reducing visibility to the first image.

Examples of the image processing for generating the second image from the first image include mosaic processing, shading processing, and warping processing.

The mosaic processing is image processing for setting a rectangle having any size in the first image and painting out pixels present in a range of the rectangle in the same color.

A first image 310 includes display objects 311, 312, and 313. The display objects 311 and 312 are display objects having rectangular frames and are, for example, windows displayed by an operating system of the personal computer 200. The display object 313 is a text arranged in the frame of the display object 312.

The first image 310 is an image having predetermined resolution and is formed by a plurality of pixels arranged side by side in the longitudinal direction and the lateral direction. The resolution of the first image 310 is optional. For example, the image processing section 145 adjusts the resolution of an image according to the display resolution of the liquid crystal panels 115 and generates the first image 310. In the following explanation, a color of the pixels forming the image 310 can be rephrased as color data of the pixels or can be rephrased as a gradation value of the pixels.

A second image 320 is shown in FIG. 6 as an example of an image generated by the mosaic processing.

The second image 320 is an image generated by applying the mosaic processing to the entire first image 310. The mosaic processing is processing for arranging a rectangle including a plurality of pixels in a part of or the entire first image 310 and changing colors of the pixels included in the rectangle to the same color. When the mosaic processing is applied to the entire first image 310, the image processing section 145 divides the first image 310 into a plurality of rectangles and changes colors of pixels included in the rectangles to the same color. As the number of pixels included in the rectangles is larger, the intensity of the mosaic processing increases and the visibility of the second mage 320 decreases. The first control section 150 may determine the color of the rectangles based on an average of color data of the pixels included in the rectangles. The color of the rectangles may be a color of a specific pixel included in the rectangles or may be set by the setting data 159 in advance. The number of pixels included in the rectangles may also be set by the setting data 159 in advance.

Since the mosaic processing is applied to the second image 320, the contours of display objects 321, 322, and 323 are blurred. For example, characters included in the display object 323 subjected to the mosaic processing are images hard to be read.

A second image 330 is shown in FIG. 7 as an example of an image generated by the shading processing.

The second image 330 is an image generated by applying the shading processing to the entire first image 310. The shading processing is processing for converting the color of the specific pixel forming the first image 310 based on the color of the specific pixel and a color of pixels located around the specific pixel. The conversion processing is, for example, processing for reducing a difference between the colors. Specifically, the color of the specific pixel is replaced with an average of pixel values of the pixels around the specific pixel by the conversion processing. In this case, when the average is calculated, an arithmetic operation for changing weight according to the distance between the specific pixel and the pixels around the specific pixel may be performed. Alternatively, the color of the specific pixel may be converted into a median of the pixel values around the specific pixel by the conversion processing. In the shading processing, as the number of peripheral pixels used for the conversion processing is larger, the intensity of the shading processing increases and the visibility of the second image 330 further deteriorated.

The shading processing is called soothing processing or blur processing as well. The shading processing can be executed by, for example, filtering performed using a filter for smoothing the color of the pixels. Parameters such as the position of the specific pixel, the number of peripheral pixels, a degree of smoothing, and the number of times of repetition of the shading processing in the shading processing may be determined based on the color of the specific pixel and an average of the colors of the plurality of pixels included in the first image 310. The parameters may be set in advance by the setting data 159. The projector 100 may repeatedly apply the shading processing to the image subjected to the shading processing.

The second image 330 is an image generated by performing the shading processing by setting all pixels forming the first image 310 as specific pixels or arranging the specific pixel for each predetermined number of pixels. Since the shading processing is applied to the second image 330, the contours of the display objects 331, 332, and 333 are blurred. For example, characters included in the display object 333 subjected to the shading processing are an image hard to be read.

A second image 340 is shown in FIG. 8 as an example of an image generated by the warping processing.

The second image 340 is an image generated by applying the warping processing to the entire first image 310. The warping processing is processing for giving coordinates in an X-Y orthogonal coordinate system to the pixels forming the first image 310 and converting the coordinates. For example, a pixel in a coordinate (x, y) is mapped to another coordinate (x', y') By performing this processing on all the pixels forming the first image 310 or a part of the pixels selected at an interval of predetermined pixels, the warping processing can be applied to the entire first image 310. In the warping processing, processing for moving coordinates of the pixels in an X-axis direction, processing for moving the coordinates of the pixels in a Y-axis direction, processing for moving the coordinates of the pixels in both of the X-axis direction and the Y-axis direction, and the like can be performed. The intensity of the warping processing increases and the visibility of the second image 340 is deteriorated as the number of pixels, coordinates of which are converted, is larger and a movement amount of coordinates of the pixels is larger. The warping processing may be repeatedly applied to an image subjected to the warping processing. The warping processing includes processing called warp deformation processing and geometric conversion processing.

A form of the second image 340 generated by the warping processing is an image distorted to form a wave or an image distorted to draw a swirl. The second image 340 shown in FIG. 8 is an image generated by applying the warping processing to the entire first image 310. The second image 340 is distorted to draw a swirl. The rectangles of the display objects 341 and 342 are deformed. The display object 343 is distorted to a degree unreadable as characters.

In this way, the projector 100 is capable of generating the second images 320, 330, and 340 generated by reducing readability of content such as characters from readability of the first image 310 obtained from the image data input to the image processing section 145. The projector 100 is capable of executing at least any one of the mosaic processing, the shading processing, and the warping processing explained above and may be capable of executing any one or more kinds of the processing selectively or in combination.

The second image is an image generated based on the first image, the image being obtained by reducing the visibility of the first image. It is more preferable that the second image is an image from which content of the first image can be estimated. In other words, it is preferable that the second image has not completely lost similarity to the first image. For example, the second image 320 is similar to the first image 310 in that the display objects 321 and 322 are the rectangles and in a positional relation between the display objects 321 and 322. The display object 323 cannot be read as characters. However, the user can recognize that the display object 323 is a character string. Therefore, viewing the second image 320, the user can estimate that the first image is the first image 310 and determine whether the first image 310 is an image suitable for display or an image not desired to be displayed.

1-6. Operation of the projector

Figure 9:
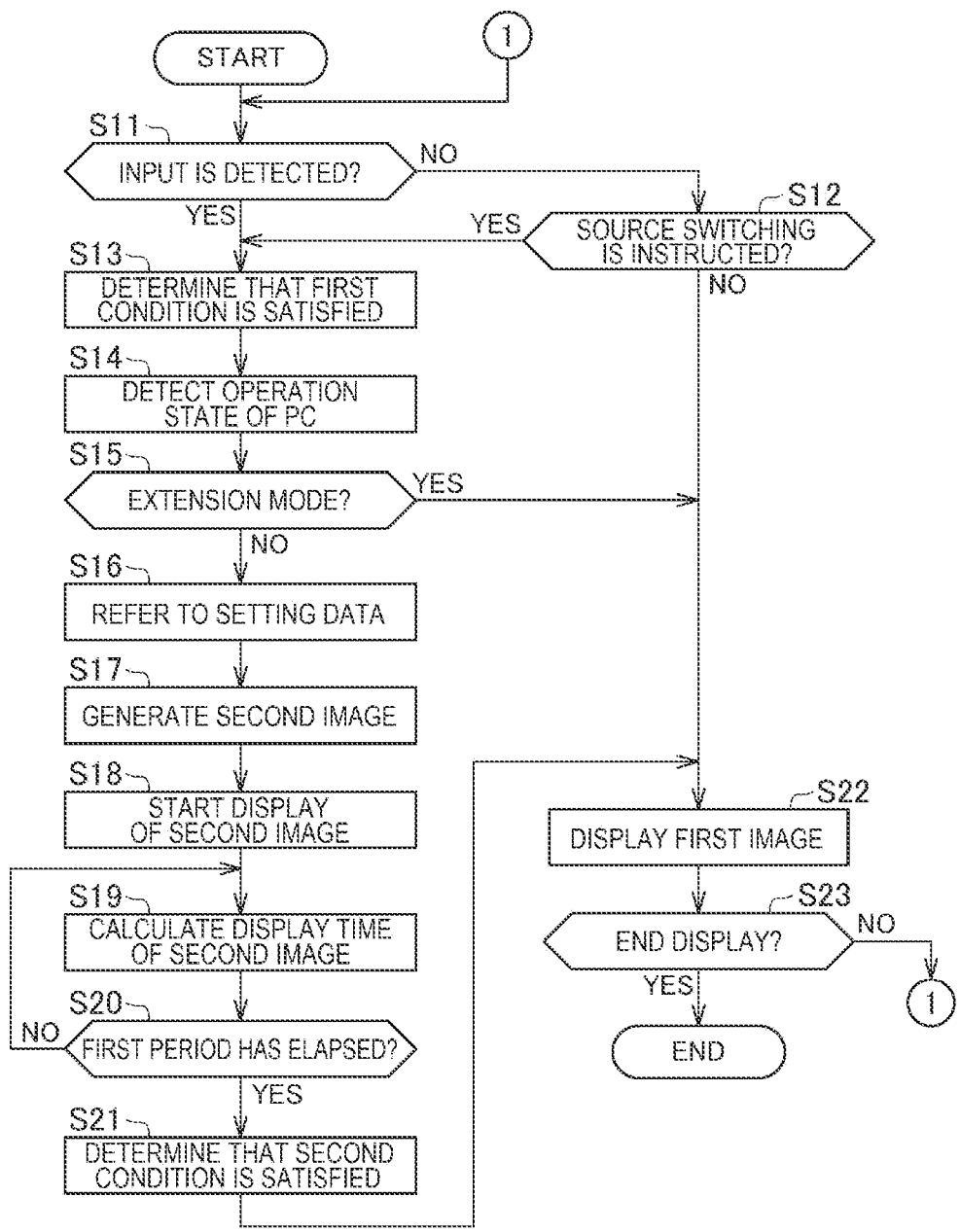
FIG. 9 is a flowchart showing the operation of the projector.

FIG. 9 is a flowchart showing the operation of the projector 100. Processing shown in FIG. 9 can be executed by the first control section 150.

The first control section 150 determines whether an input of new image data to the image interface 141 has been detected (step S11). In step S11, when the image supply devices 21 and 22 or the personal computer 200 starts an output of image data to the image interface 141, an affirmative determination is made. When an input of new image data has been detected (YES in step S11), the first control section 150 shifts to step S13 explained below.

When an input of new image data is not detected (NO in step S11), the first control section 150 determines whether switching of an image source has been instructed (step S12). In step S12, when the operation section 131 or the remote-controller-light receiving section 133 receives operation for instructing switching of the image source, the first control section 150 makes an affirmative determination. When switching of the image source is instructed (YES in step S12), the first control section 150 shifts to step S13. When switching of the image source is not instructed (NO in step S12), the first control section 150 shifts to step S22.

In step S13, the first control section 150 determines that the first condition is satisfied and switches the image source. That is, in this embodiment, the first condition is that new image data is input to the image interface 141 or switching of the image source is instructed by the user. In step S13, the first control section 150 causes the image interface 141 to select the new input image data detected in step S11 or the image source instructed to be switched in step S12.

When the image source selected by the image interface 141 is the personal computer 200, the first control section 150 detects an operation state of the personal computer 200 (step S14). In step S14, the first control section 150 refers to control data input from the personal computer 200 together with the image data and detects whether the personal computer 200 is in the extension mode.

The first control section 150 determines whether the personal computer 200 is in the extension mode (step S15). When determining that the personal computer 200 is in the extension mode (YES in step S15), the first control section 150 shifts to step S22 explained below.

When determining that the personal computer 200 is not in the extension mode (NO in step S15), the first control section 150 refers to the setting data 159 (step S16). When the image source selected by the image interface 141 is not the personal computer 200, the first control section 150 also shifts to step S16. In this case, the first control section 150 may omit steps S14 and S15.

In step S16, the first control section 150 acquires setting content concerning generation of the second image from the setting data 159.

The first control section 150 controls the image processing section 145 according to the setting data 159 to start processing for generating the second image from the first image (step S17). The first control section 150 causes the projecting section 110 to start display of the second image generated by the image processing section 145 (step S10).

The first control section 150 calculates an elapsed time after the display of the second image is started in step S18, that is, a display time of the second image (step S19). The first control section 150 determines, based on the display time calculated in step S19, whether a first period has elapsed after the display of the second image is started (step S20). When the first period has not elapsed (NO in step S20), the first control section 150 repeatedly performs the processing in step S19.

When the first period has elapsed (YES in step S20), the first control section 150 determines that the second condition is satisfied (step S21). That is, in this embodiment, the second condition is that the first period elapses after the display of the second image is started. The first control section 150 shifts to step S22.

In step S22, the first control section 150 controls the image processing section 145 to generate the first image based on the image data input to the image interface 141 and causes the projecting section 110 to start display of the first image.

The first control section 150 determines whether to end the display (step S23). For example, when operation for instructing a display end is received by the operation section 131 or the remote-controller-light receiving section 133, the first control section 150 makes an affirmative determination. When determining to end the display (YES in step S23), the first control section 150 stops the display by the projecting section 110 and ends this processing. When determining not to end the display (NO in step S23), the first control section 150 returns to step S11.

1-7. Action Effect in the First Embodiment

As explained above, the projector 100 according to this embodiment includes the projecting section 110 that displays an image and the image interface 141 to which an image signal corresponding to the first image is input from the personal computer 200. The projector 100 includes the image processing section 145 that processes the first image based on the image signal and generates the second image obtained by reducing the visibility of the first image. The projector 100 includes the first control section 150 that, when the first condition is satisfied, causes the projecting section 110 to display the second image and, when the second condition is satisfied, causes the projecting section 110 to display the first image.

The display system 1 includes the projector 100 including the projecting section 110 that displays an image and the personal computer 200 that inputs an image signal corresponding to the first image to the projector 100. The projector 100 includes the image processing section 145 that processes the first image based on the image signal and generates the second image obtained by reducing the visibility of the first image. The projector 100 includes the first control section 150 that, when the first condition is satisfied, causes the projecting section 110 to display the second image and, when the second condition is satisfied, causes the projecting section 110 to display the first image.

With a display control method in the projector 100, the first image is processed based on an image signal of the first image input from the personal computer 200 to generate the second image obtained by reducing the visibility of the first image. When the first condition is satisfied, the projecting section 110 is caused to display the second image. When the second condition is satisfied, the projecting section 110 is caused to display the first image.

With the projector 100, the display system 1 including the projector 100, and the display control method in the projector 100, the following action effects are obtained.

When the first condition is satisfied, the second image obtained by reducing the visibility of the first image is displayed by the projector 100. For example, if the first condition and the second condition are set to display the second image earlier than the first image, the second image is displayed earlier than the first image. In this case, when the first image is an image not desired to be made public, display of the first image can be prevented. Since the second image is generated from, the first image, the user can estimate content of the first image from the second image displayed by the projector 100. Accordingly, the user can determine, based on the second image, whether the first image is an image that may be made public.

When the second condition is satisfied in a state in which the second image is displayed, the projector 100 may switch the image displayed by the projecting section 110 from the second image to the first image. In this case, in a state in which the second image is displayed earlier, the user can determine whether the first image may be displayed.

The first condition is that an input of an image signal to the image interface 141 is started in this case, when an image signal is input to the image interface 141 included in the projector 100, the first image is not displayed and the second image is displayed. Accordingly, for example, even if an image input to the image interface 141 anew is an image not desired to be displayed, it is possible to prevent such an image from being clearly displayed. Even if a display start of an image is not instructed according to the input of the image signal to the image interface 141, it is possible to switch the image displayed by the projecting section 110. There is an advantage that convenience is high.

The first condition is that processing for causing the projecting section 110 to display the first image is started. In this case, when processing for displaying an image based on an image signal input to the image interface 141 is started, first, the second image is displayed by the projecting section 110. The processing for displaying the first image is, for example, processing in which the first control section 150 selects or switches an image source. In this case, for example, even if an image input anew is an image not desired to be displayed, it is possible to prevent such an image from being clearly displayed. Accordingly, even if an image input from the image source cannot be checked before the image source is switched, it is possible to prevent the image not desired to be displayed from being displayed on the screen SC.

The second condition is that the first period elapses after the first control section 150 causes the projecting section 110 to display the second image. In this case, when the first period elapses after the second image is displayed, the first image is displayed. The user only has to determine, within the first period, whether the first image may be displayed. When the first image is an image that may be displayed, if the user waits until the first period elapses, the first image is displayed. Therefore, operation by the user is simple.

When the first image is an image not desired to be displayed, it is possible to prevent display of the first image if the display of the projector 100 is stopped before the first period elapses.

In this embodiment, the second condition may be that the input of an image signal to the image interface 141 and the processing for causing the projecting section 110 to display the second image are started and the first period elapses after later one of the input and the processing is started. Specifically, when the first period has elapsed starting from later timing of timing when the input is detected in step S11 and timing when the display of the second image is started in step S18, the first control section 150 determines that the second condition is satisfied. In this case, the second image is surely displayed for the first period until the second condition is satisfied. Accordingly, the user can secure a time for determining whether the first image is an image that may be displayed.

For example, the image processing section 145 applies the mosaic processing to the first image to thereby generate the second image. In this case, it is possible to easily generate, as the second image, an image obtained by reducing the visibility of the first image with the mosaic processing, the user being capable of estimating content, of the first image from the image.

For example, the image processing section 145 applies the shading processing to the first image to thereby generate the second image. In this case, it is possible to easily generate, as the second image, an image obtained by reducing the visibility of the first image with the shading processing, the user being capable of estimating content of the first image from the image.

For example, the image processing section 145 applies the warping processing to the first image to thereby generate the second image. In this case, it is possible to easily generate, as the second image, an image obtained by reducing the visibility of the first image by deforming the first image, the user being capable of estimating content of the first image from the image.

The first control section 150 detects an operation state of the personal computer 200 and, when the personal computer 200 is in the first operation state, causes the projecting section 110 to display the second image when the first condition is satisfied. When the personal computer 200 is in the second operation state, the first control section 150 causes the projecting section 110 to display the first image without causing the projecting section 110 to display, the second image. As explained above, the first operation state of the personal computer 200 is, for example, the mirroring mode and the second operation state of the personal computer 200 is, for example, the extension mode. When the personal computer 200 is in the extension mode, an image input from the personal computer 200 to the projector 100 is an image different from an image displayed on the PC display section 232. Accordingly, it is highly likely that the first image based on the image data input from the personal computer 200 is an image that may be displayed by the projector 100. In such a case, the first control section 150 does not display the second image. Therefore, there is an advantage that it is possible to quickly display an image output by the personal computer 200 on the screen SC.

2. Second Embodiment

Figure 10:
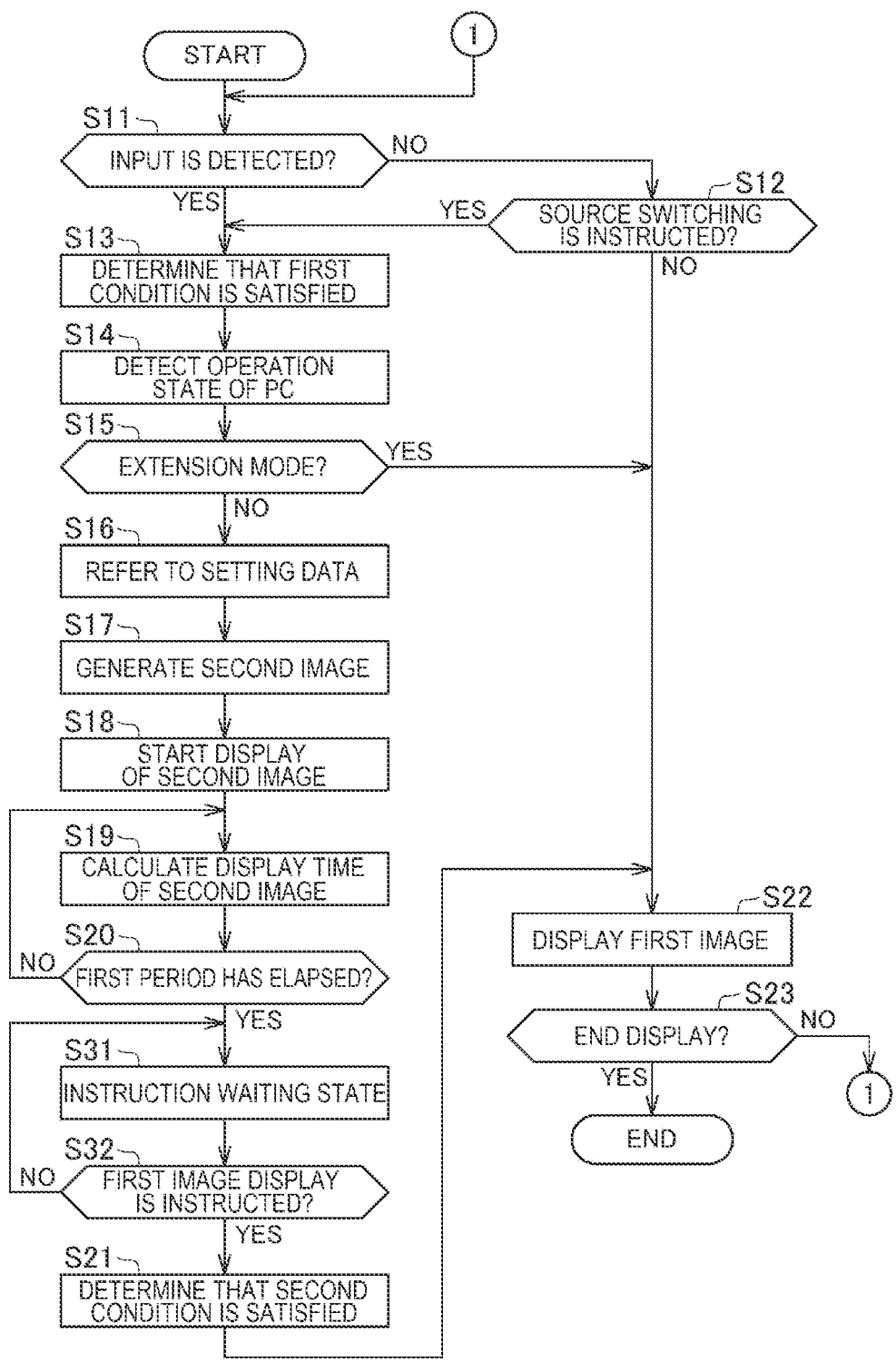
FIG. 10 is a flowchart showing the operation of a projector in a second embodiment.

FIG. 10 is a flowchart showing the operation of the projector 100 in a second embodiment to which the present disclosure is applied. In FIG. 10, processing common to FIG. 9 is denoted by the same step numbers and explanation about the processing is omitted.

The second embodiment is another operation example of the projector 100 explained in the first embodiment. Accordingly, since the configurations or the sections of the display system 1 in the second embodiment are common to the first embodiment, illustration and explanation about the configurations are omitted.

In the second embodiment, after determining in step S20 that the first period has elapsed (YES in step S20), the first control section 150 shifts to an instruction waiting state (step S31). In the instruction waiting state, the first control section 150 waits for, with the operation section 131 and/or the remote-controller-light receiving section 133, operation for instructing display of the first image. The first control section 150 determines presence or absence of the operation for instructing display of the first image (step S32) and, while the relevant operation is absent (NO in step S32), continues the instruction waiting state in step S31. When receiving the operation for instructing display of the first image (YES in step S32), the first control section 150 determines in step S21 that the second condition is satisfied.

That is, in the second embodiment, when the first period elapses after the display of the second image is started and when the operation for instructing display of the first image is performed, the first control section 150 determines that the second condition is satisfied.

As explained above the projector 100 in the second embodiment includes the operation section 131 and the remote-controller-light receiving section 133 as the receiving section that receives operation. The second condition is that, after the first period elapses, the operation for instructing display of the first image is received by the receiving section. Consequently, while the operation for instructing display of the first image is not performed, the display of the second image is continued even if the first period elapses. Accordingly, when the first image is an image not desired to be displayed, it is possible to prevent the first image from being displayed on the screen SC. It is possible to cause the screen SC to display the first image after the user confirms that the first image is not an image not desired to be displayed.

3. Third Embodiment

Figure 11:
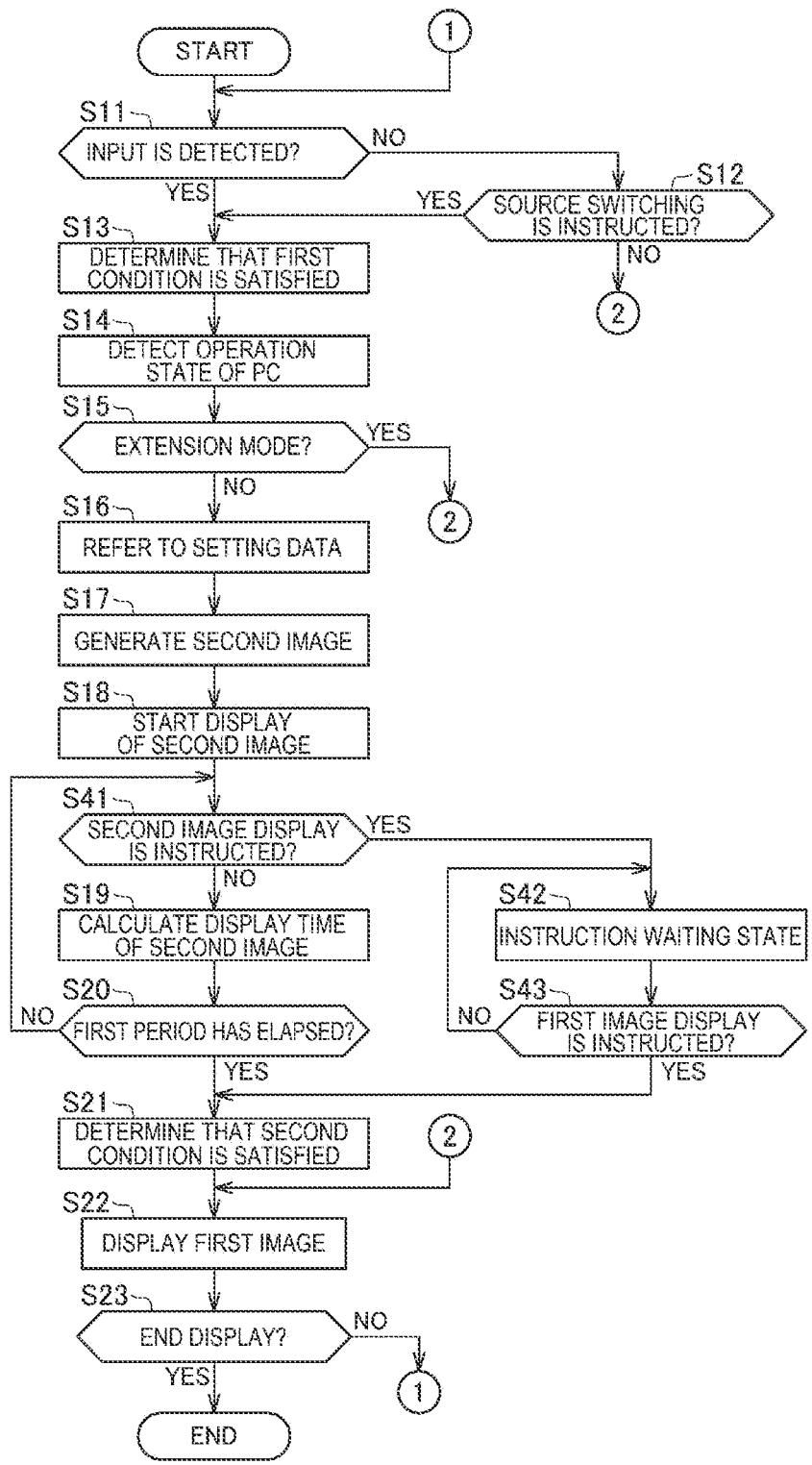
FIG. 11 is a flowchart showing the operation of a projector in a third embodiment.

FIG. 11 is a flowchart showing the operation of the projector 100 in a third embodiment to which the present disclosure is applied. In FIG. 11, processing common to FIG. 9 is denoted by the same step numbers and explanation of the processing is omitted.

The third embodiment is another operation example of the projector 100 explained in the first embodiment. Accordingly, the configurations of the sections of the display system 1 in the third embodiment are common to the first embodiment. Therefore, illustration and explanation about the configurations are omitted.

In the third embodiment, after causing the projecting section 110 to display the second image in step S18, the first control section 150 determines whether operation for instructing display of the second image has been performed (step S41). In step S41, the first control section 150 waits for, with the operation section 131 and/or the remote-controller-light receiving section 133, operation for instructing display of the second image. Specifically, this operation is an instruction to continue the display of the second image.

When the operation for instructing display of the second image is not performed (NO in step S41), the first control section 150 calculates a display time of the second image (step S19). The first control section 150 determines whether the first period has elapsed after the display of the second image is started (step S20). When the first period has not elapsed (NO n step S20), the first control section 150 returns to step S41.

When determining that the operation for instructing display of the second image has been performed (YES in step S41), the first control section 150 shifts to an instruction waiting state (step S42). The instruction waiting state in step S42 is a state in which the first control section 150 waits for, with the operation section 131 and/or the remote-controller-light receiving section 133, the operation for instructing display of the first image. In the instruction waiting state in step S42, the projecting section 110 continues the display of the second image.

The first control section 150 determines presence or absence of the operation for instructing display of the first image (step S43) and, while the relevant operation is absent (NO in step S43), continues the instruction waiting state in step S42. When receiving the operation for instructing display of the first image (YES in step S43), the first control section 150 determines in step S21 that the second condition is satisfied.

That is, in the third embodiment, when the instruction to continue displaying the second image is performed after the display of the second image is started, the first control section 150 shifts to the instruction waiting state. In this case, the first control section 150 continues the display of the second image until the operation for instructing display of the first image is performed.

In the third embodiment, when the first period has elapsed while the instruction to continuously display the second image is not performed after the display of the second image is started, the first control section 150 determines that the second condition is satisfied.

In this way, in the projector 100 in the third embodiment when the first period has elapsed in the state in which the operation for instruct ng continuation of the display of the second image is not received, the first control section 150 determines that the second condition is satisfied. When the operation for instructing continuation of the display or the second image is received before the first period elapses after the first control section 150 causes the projecting section 110 to display the second image, the first control section 150 causes the projecting section 110 to continue the display of the second image. Accordingly, according to operation by the user, even if the first period has elapsed, it is possible to continue the display of the second image. When the first image is an image not desired to be displayed, it is possible to prevent the first image from being displayed on the screen SC. It is possible to cause the screen SC to display the first image after the user confirms that the first image is not an image not desired to be displayed.

Further, when the operation for instructing continuation of display of the second image is received, according to the operation for instructing display of the first image, it is possible to change the image displayed by the projecting section 110 to the first image. Accordingly, it is possible to quickly display the first image according to operation by the user. Therefore, it is possible to execute the continuation of the display of the second image and the switching to the display of the first image at timing requested by the user without being limited to the elapse of the first period.

4. Other Embodiments

The embodiments explained above are preferred modes of implementation. However, the preferred modes of implementation are not limited to the embodiments. Various modified implementations are possible within a range not departing from the gist.

For example, in the operation example explained in the embodiments, the projector 100 displays the first image and the second image based on the image data output to the projector 100 by the personal computer 200. The present disclosure is not limited to this. The projector 100 may display the first image and the second image based on image data and image signals output by the image supply devices 21 and 22.

The projector 100 in the embodiments includes the operation section 131 and the remote-controller-light receiving section 133 as the receiving section that receives operation. However, the projector 100 may receive operation with other configurations. For example, the projector 100 may be capable of wirelessly receiving control data including a command from a device such as a smartphone by wireless communication such as Wi-Fi. In this case, the projector 100 may receive, as operation, the command included in the control data.

For example, the display device according to the present disclosure is not limited to the projector that projects an image onto the screen SC and may be a liquid crystal display that displays an image on a liquid crystal display panel. The display device according to the present disclosure may be a display device that displays an image on a plasma display panel or an organic EL (Electro Luminescence) panel. In this case, the liquid crystal display panel, the plasma display panel, or the organic EL panel corresponds to an example of the display section.

The functional sections shown in FIGS. 2, 3, and 4 indicate functional components. Specific implementation forms of the functional sections are not particularly limited. For example, hardware individually corresponding to the functional sections does not always need to be implemented. It is also naturally possible to adopt a configuration in which one processor executes a program to realize functions of a plurality of functional sections. A part of the functions realized by software in the embodiment may be realized by hardware or a part of the functions realized by hardware may be realized by software. Besides, the specific detailed configurations of the other sections of the projector 100 can also be optionally changed in a range not departing from the gist.

The processing units of the flowcharts of FIGS. 9, 10, and 11 are divided according to the main processing contents in order to make it easy to understand the processing of the first control section 150. The processing units can also be divided into larger number of processing units according to processing contents without being limited by the ways and the names of the divisions of the processing units shown in the flowcharts. The processing units can also be divided such that one processing unit includes larger number of kinds of processing. The processing order of the flowcharts is not limited to the example shown in the figures.

A control method for the projector 100 functioning as the display device can be realized by causing the processor 153 included in the projector 100 to execute a control program corresponding to the control method for the projector 100. The control program can also be recorded in a recording medium in which the control program is computer-readably recorded. The control method for the projector 100 can also be realized by storing the control program corresponding to the control method for the projector 100 in a server device or the like and downloading the control program from the server device to the projector 100.

What is claimed is:

1. A display device comprising:
   a display section configured to display an image;
   an interface circuit to which an image signal corresponding to a first image is input from an image supply device;
   an integrated circuit configured to generate a second image obtained by reducing visibility of the first image based on the image signal; and
   a processor programmed to, when a first condition is satisfied, cause the display section to display the second image and, when a second condition is satisfied, cause the display section to display the first image wherein,
   the integrated circuit applies mosaic processing, shading processing or warping processing to the first image to thereby generate the second image,
   wherein the first condition is that new image data is input to the interface circuit or switching of the image supply device is instructed by a user, and
   wherein the processor is further programmed to, after the second image is displayed, if no input from the user is detected for a first period, automatically display the first image.

2. The display device according to claim 1, wherein the second condition is that both of the input of the image signal to the interface circuit and processing for causing the display section to display the second image are started and a first period elapses after later one of the input and the processing is started.

3. The display device according to claim 1, further comprising a receiver configured to receive operation, wherein the second condition is that, after the first period elapses, operation for instructing the display of the first image is received by the receiver.

4. The display device according to claim 1, further comprising a receiver configured to receive operation, wherein when the first period elapses in a state in which operation is not received by the receiver after the processor causes the display section to display the second image, the processor determines that the second condition is satisfied, and
   when operation is received by the receiving section before the first period elapses after the processor causes the display section to display the second image, the processor continues the display of the second image.

5. A display device comprising:
   a display section configured to display an image;
   an interface circuit to which an image signal corresponding to a first image is input from an image supply device;
   an integrated circuit configured to generate a second image obtained by reducing visibility of the first image based on the image signal; and
   a processor programmed to, when a first condition is satisfied, cause the display section to display the second image and, when a second condition is satisfied, cause the display section to display the first image, wherein
   the processor detects an operation state of the image supply device,
   when the image supply device is in a first operation state, the processor causes the display section to display the second image when the first condition is satisfied, and
   when the image supply device is in a second operation state, the processor causes the display section to display the first image without causing the display section to display the second image, wherein the first condition is that new image data is input to the interface circuit or switching of the image supply device is instructed by a user, and the processor is further programmed to, after the second image is displayed, if no input from the user is detected for a first period, automatically display the first image.

6. The display device according to claim 5, wherein the second condition is that both of the input of the image signal to the interface circuit and processing for causing the display section to display the second image are started and a first period elapses after later one of the input and the processing is started.

7. The display device according to claim 5, further comprising a receiver configured to receive operation, wherein the second condition is that, after the first period elapses, operation for instructing the display of the first image is received by the receiver.

8. The display device according to claim 5, further comprising a receiver configured to receive operation, wherein when the first period elapses in a state in which operation is not received by the receiver after the processor causes the display section to display the second image, the processor determines that the second condition is satisfied, and when operation is received by the receiving section before the first period elapses after the processor causes the display section to display the second image, the processor continues the display of the second image.

9. The display device according to claim 5, wherein the integrated circuit applies mosaic processing to the first image to thereby generate the second image.

10. The display device according to claim 5, wherein the integrated circuit applies shading processing to the first image to thereby generate the second image.

11. The display device according to claim 5, wherein the integrated circuit applies warping processing to the first image to thereby generate the second image.

12. A display device comprising:

a display section configured to display an image;

an interface circuit to which an image signal corresponding to a first image is input from an image supply device;

an integrated circuit configured to generate a second image obtained by reducing visibility of the first image based on the image signal; and a processor programmed to, when a first condition is satisfied, cause the display section to display the second image and, when a second condition is satisfied, cause the display section to display the first image, wherein, the first condition is that new image data is input to the interface circuit or switching of the image supply device is instructed by a user, and the processor is further programmed to, after the second image is displayed, if no input from the user is detected for a first period, automatically display the first image.

* * * * *